(12) United States Patent
Baumeister

(10) Patent No.: US 10,961,001 B2
(45) Date of Patent: Mar. 30, 2021

(54) TRANSFER WHEEL BETWEEN A LOLLIPOP FORMING AND A LOLLIPOP WRAPPING UNIT

(71) Applicant: GEA Food Solutions Weert B.V., RV Weert (NL)

(72) Inventor: Bruno Gerfried Baumeister, Aachen (DE)

(73) Assignee: GEA FOOD SOLUTIONS WEERT B.V., Rv Weert (NL)

( * ) Notice: Subject to any disclaimer, the term of this patent is extended or adjusted under 35 U.S.C. 154(b) by 0 days.

(21) Appl. No.: 16/901,169

(22) Filed: Jun. 15, 2020

(65) Prior Publication Data

US 2020/0307840 A1 Oct. 1, 2020

Related U.S. Application Data

(62) Division of application No. 15/311,295, filed as application No. PCT/EP2015/060941 on May 19, 2015.

(30) Foreign Application Priority Data

May 20, 2014 (EP) ..................................... 14169067

(51) Int. Cl.
*B65B 35/26* (2006.01)
*B65B 25/00* (2006.01)
(Continued)

(52) U.S. Cl.
CPC .............. *B65B 35/26* (2013.01); *A23G 3/125* (2013.01); *A23G 3/563* (2013.01); *A23G 7/0031* (2013.01);
(Continued)

(58) Field of Classification Search
CPC ......... B65B 35/16; B65B 35/26; B65B 35/58; B65B 25/006; B65G 47/847;
(Continued)

(56) References Cited

U.S. PATENT DOCUMENTS 1,809,358 A 6/1931 Savage
2,119,358 A 5/1938 Scharf
(Continued)

FOREIGN PATENT DOCUMENTS

DE 712126 C 10/1941
DE 4213830 A1 11/1993
(Continued)

OTHER PUBLICATIONS

International Search Report and Written Opinion for International Application No. PCT/EP2015/060941, dated Sep. 18, 2015.
(Continued)

*Primary Examiner* — James R Bidwell
(74) *Attorney, Agent, or Firm* — The Dobrusin Law Firm, P.C.

(57) ABSTRACT

A lollipop production and down-stream processing apparatus with a forming unit and a down-stream processing unit and a transfer wheel in between the units which rotates around a first axis and which includes a multitude of grippers which releasably hold the stick of the lollipop and which rotate relative to the transfer wheel around a second axis of rotation parallel to the first axis of rotation.

15 Claims, 8 Drawing Sheets

(51) Int. Cl.
*B65B 35/16* (2006.01)
*B65B 35/58* (2006.01)
*A23G 3/56* (2006.01)
*A23G 7/00* (2006.01)
*A23G 3/12* (2006.01)
*B65G 47/86* (2006.01)

(52) U.S. Cl.
CPC .......... *A23G 7/0081* (2013.01); *B65B 25/006* (2013.01); *B65B 35/16* (2013.01); *B65B 35/58* (2013.01); *B65G 47/847* (2013.01)

(58) Field of Classification Search
CPC ...... B65G 47/848; A23G 3/125; A23G 3/563; A23G 7/0031; A23G 7/0081
USPC ...................... 198/470.1, 474.1, 475.1, 476.1
See application file for complete search history.

(56) References Cited

U.S. PATENT DOCUMENTS

| | | | |
|---|---|---|---|
| 2,246,243 A | 6/1941 | Ross | |
| 2,316,506 A | 4/1943 | Doelker et al. | |
| 2,678,371 A | 5/1954 | Andrew | |
| 2,705,857 A | 4/1955 | Fox et al. | |
| 2,872,768 A | 2/1959 | Shepler | |
| 2,945,935 A | 7/1960 | Messner et al. | |
| 3,038,635 A | 6/1962 | Rasmussen | |
| 3,264,115 A | 8/1966 | Davis | |
| 3,272,152 A | 9/1966 | Williams | |
| 3,303,926 A * | 2/1967 | Pohl | A24C 5/326 198/471.1 |
| 3,319,764 A | 5/1967 | Gamberini | |
| 3,517,477 A * | 6/1970 | Thornton | B65B 19/32 198/475.1 |
| 3,541,973 A | 11/1970 | Aquarius | |
| 3,741,698 A | 6/1973 | Caroli | |
| 3,851,440 A | 12/1974 | Horsky | |
| 3,925,139 A | 12/1975 | Simmons | |
| 3,987,605 A | 10/1976 | Johnson | |
| 4,008,812 A | 2/1977 | Stuart | |
| 4,044,659 A * | 8/1977 | Bardenhagen | A24D 3/0287 198/475.1 |
| 4,130,936 A | 12/1978 | Cottrell | |
| 4,159,612 A | 7/1979 | Johnson et al. | |
| 4,335,147 A | 6/1982 | Sollich | |
| 4,459,792 A | 7/1984 | Derckx | |
| 4,506,779 A * | 3/1985 | Seragnoli | B65G 47/848 198/459.1 |
| 4,507,070 A | 3/1985 | Armstrong et al. | |
| 4,535,605 A | 8/1985 | Gram | |
| 4,539,790 A | 9/1985 | Zamboni | |
| 4,714,419 A | 12/1987 | Nielsen | |
| 4,729,501 A | 3/1988 | Lowrance | |
| 4,993,211 A * | 2/1991 | Piano | B65B 11/10 53/435 |
| 5,016,421 A | 5/1991 | Ferrero | |
| 5,108,279 A | 4/1992 | Heckler et al. | |
| 5,117,613 A | 6/1992 | Pfaffmann | |
| 5,241,807 A | 9/1993 | Quick et al. | |
| 5,450,706 A | 9/1995 | Latini | |
| 5,490,368 A * | 2/1996 | Spatafora | B65B 11/32 53/234 |
| 5,519,981 A | 5/1996 | Fukusaki | |
| 5,635,230 A | 6/1997 | Aasted | |
| 5,715,645 A | 2/1998 | Fukuda | |
| 5,746,872 A | 5/1998 | Spatafora et al. | |
| 5,755,907 A | 5/1998 | Spatafora et al. | |
| 5,826,403 A | 10/1998 | Haley | |
| 6,077,144 A | 6/2000 | Fishman | |
| 6,094,893 A | 8/2000 | Draghetti et al. | |
| 6,402,496 B2 | 6/2002 | Ishikawa et al. | |
| 6,406,733 B1 | 6/2002 | Willcocks et al. | |
| 6,435,336 B1 | 8/2002 | Knödler | |
| 6,633,480 B1 | 10/2003 | Herzog | |
| 6,732,496 B1 | 5/2004 | Wessman et al. | |
| 6,932,134 B2 | 8/2005 | Selle et al. | |
| 7,210,916 B2 | 5/2007 | Korndorfer et al. | |
| 7,210,926 B2 | 5/2007 | Korndorfer et al. | |
| 7,287,361 B2 | 10/2007 | Asma | |
| 7,344,742 B2 | 3/2008 | Wray et al. | |
| 7,454,886 B2 | 11/2008 | Asma | |
| 7,707,930 B2 | 5/2010 | Asma | |
| 7,730,699 B2 | 6/2010 | Asma | |
| 7,739,860 B2 * | 6/2010 | Van Rens | B29C 66/8221 53/466 |
| 7,878,333 B1 | 2/2011 | Necessary | |
| 8,397,476 B2 | 3/2013 | Van Rens | |
| 2004/0231962 A1 | 11/2004 | Noll, Jr. | |
| 2006/0107622 A1 | 5/2006 | James et al. | |
| 2007/0272089 A1 | 11/2007 | Seferinus | |
| 2009/0019820 A1 | 1/2009 | Asma et al. | |
| 2009/0056287 A1 | 3/2009 | Cuypers | |
| 2009/0294251 A1 | 12/2009 | Asma | |
| 2013/0111850 A1 | 5/2013 | Civolani et al. | |
| 2013/0270067 A1 * | 10/2013 | Papsdorf | B65G 47/847 198/377.01 |

FOREIGN PATENT DOCUMENTS

| | | |
|---|---|---|
| DE | 19502562 A1 | 8/1996 |
| DE | 19616989 C1 | 10/1997 |
| DE | 10319829 A1 | 11/2004 |
| EP | 0036282 A1 | 9/1981 |
| EP | 0073535 A2 | 3/1983 |
| EP | 0616942 A1 | 9/1994 |
| EP | 0842854 A2 | 5/1998 |
| EP | 0742152 B1 | 8/1999 |
| EP | 0950608 A1 | 10/1999 |
| EP | 0737619 B1 | 11/1999 |
| EP | 0956776 A1 | 11/1999 |
| EP | 1041005 A1 | 10/2000 |
| EP | 1357063 B1 | 3/2005 |
| EP | 1847179 A1 | 10/2007 |
| GB | 328145 A | 4/1930 |
| GB | 374653 A | 6/1932 |
| GB | 406220 A | 2/1934 |
| GB | 998643 A | 7/1965 |
| GB | 1214983 A | 12/1970 |
| GB | 2219725 A | 12/1989 |
| GB | 2229347 A | 9/1990 |
| GB | 2312411 A | 10/1997 |
| JP | 9039919 | 2/1997 |
| NL | 1028769 C2 | 10/2006 |
| WO | 95/32633 A | 12/1995 |
| WO | 98/30111 A | 7/1998 |
| WO | 00/21835 A1 | 4/2000 |
| WO | 0041573 A1 | 7/2000 |
| WO | 03/086871 A1 | 10/2003 |
| WO | 2004/066747 A1 | 8/2004 |
| WO | 2004/113172 A1 | 12/2004 |
| WO | 2005/014448 A1 | 2/2005 |
| WO | 2005/041679 A2 | 5/2005 |
| WO | 2006/014108 A1 | 2/2006 |
| WO | 2006/108781 A1 | 10/2006 |
| WO | 2006/108782 A1 | 10/2006 |
| WO | 2006/136394 A2 | 12/2006 |
| WO | 2007/134708 A2 | 12/2006 |
| WO | 2007/091164 A1 | 8/2007 |
| WO | 2007/121930 A1 | 11/2007 |

OTHER PUBLICATIONS

Preliminary Report on Patentability for International Application No. PCT/EP2015/060941, dated Aug. 8, 2016.
International Search Report and Written Opinion for International Application No. PCT/EP2006/061315, dated Jul. 13, 2006.
Preliminary Report on Patentability for International Application No. PCT/EP2006/061315, dated Oct. 16, 2007.
International Search Report and Written Opinion for International Application No. PCT/EP2006/061314, dated Jun. 28, 2006.
Preliminary Report on Patentability for International Application No. PCT/EP2006/061314 dated Oct. 16, 2007.

(56) References Cited

OTHER PUBLICATIONS

International Search Report and Written Opinion for International Application PCT/EP2007/003986, dated Jul. 6, 2007.
Preliminary Report on Patentability for International Application No. PCT/EP2007/003986, dated Oct. 7, 2007.
International Search Report and Written Opinion for International Application No. PCT/NL2004/000768 dated Aug. 11, 2005.
Preliminary Report on Patentability for International Application No. PCT/NL2004/000768, dated May 8, 2006.
Communication under Rule 71(3) EPC (intention to grant) dated Apr. 17, 2019 for EP Application No. 15 722 549.1.
Decision to grant a European Patent Pursuant to Article 9791) EPC dated Sep. 5, 2019 for EP Application No. 15722549.1.
Extended European Search Report for European Application No. 192007901 dated May 15, 2020.

\* cited by examiner

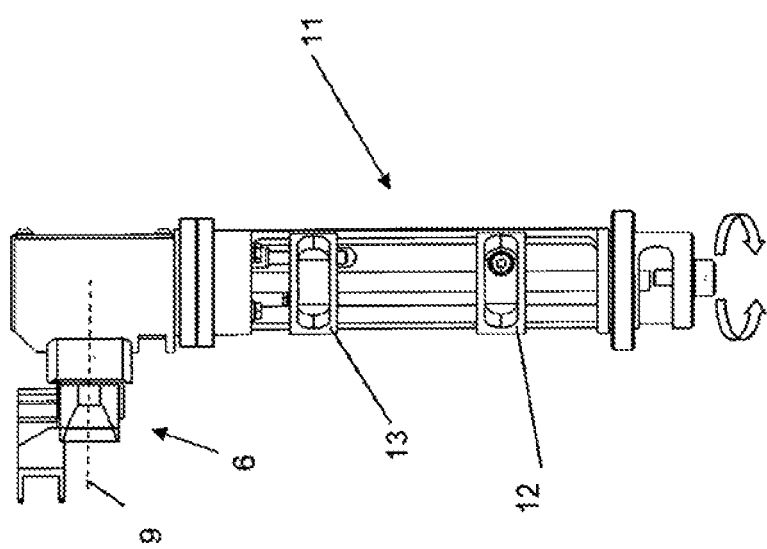

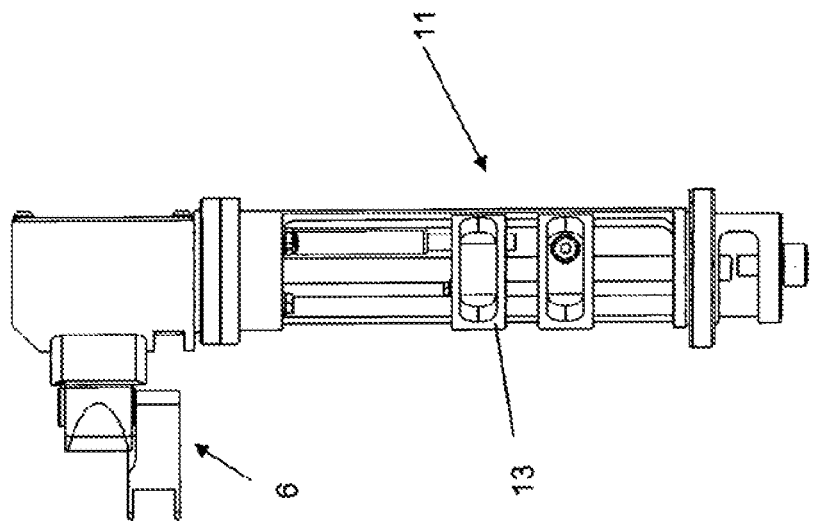

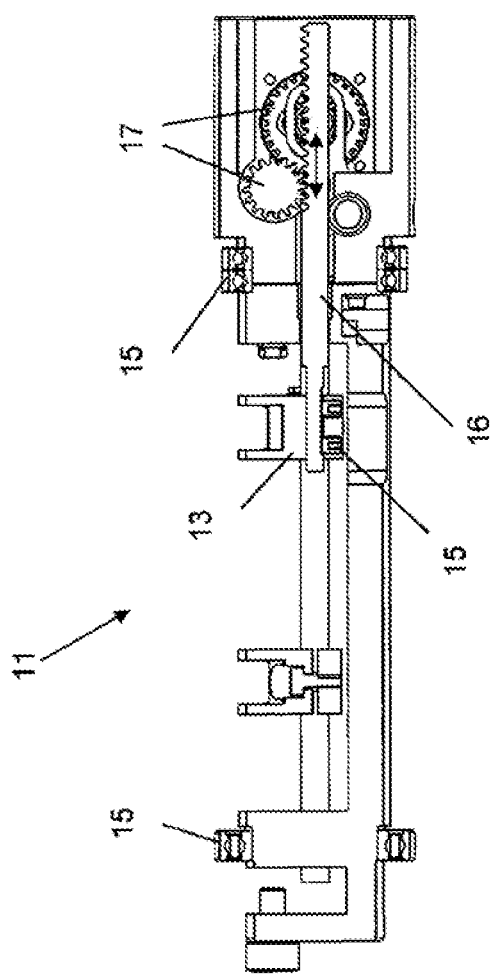

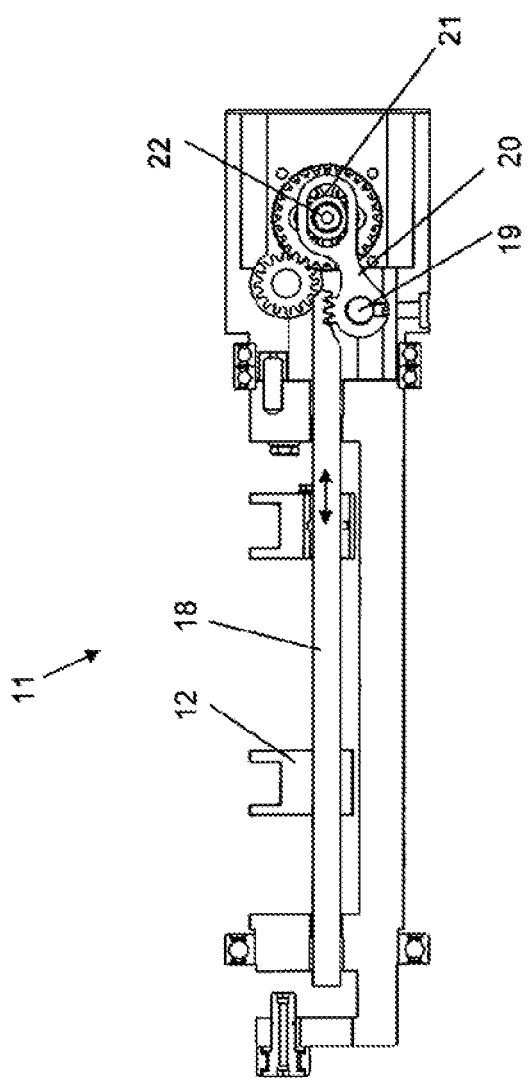

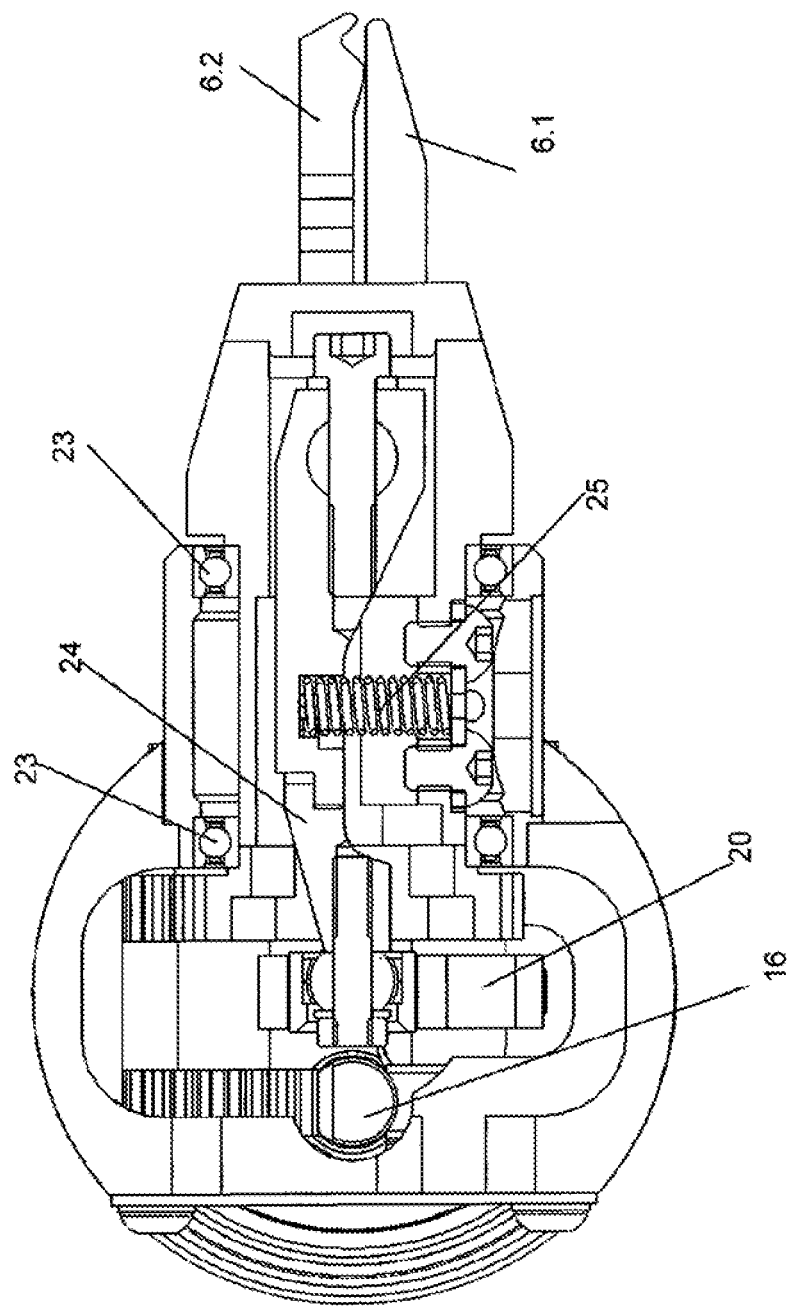

TRANSFER WHEEL BETWEEN A LOLLIPOP FORMING AND A LOLLIPOP WRAPPING UNIT

FIELD

The present invention relates to a lollipop production and down-stream processing apparatus with a forming unit and a down-stream processing unit and a transfer wheel in between the units.

BACKGROUND

Such apparatus and methods are well known and are utilized to produce lollipops. The forming unit comprises a rotating drum with a multitude of forming chambers, for example at the circumference of the drum. In the forming unit, a piece of material is cut from a strand and formed into the head of the lollipop. During and/or after this forming step, a stick is inserted into the lollipop head. The lollipop is held at the forming unit until it is handed over to a down-stream processing unit, for example a packaging unit in which the head of the lollipop or the entire lollipop is wrapped in a plastic film. This handing over is carried out by a transfer wheel with grippers, which grasp the stick of the lollipop and move the lollipop out of the holding means of the forming unit and move it over to the packaging unit, which also comprise holding means to take over the stick of the lollipop. Since these apparatus must be very flexible and highly reliable, there is a constant need to improve these apparatus and methods.

It was therefore the objective of the present invention to provide an improved lollipop production and wrapping apparatus.

SUMMARY

The problem is solved with a lollipop production and wrapping apparatus with a forming unit and a down-stream processing unit and a transfer wheel in between the units which rotates around a first axis and which comprises a multitude of grippers which releasably hold the stick of the lollipop and which move relative to the transfer wheel, preferably around a second axis of rotation parallel to the first axis of rotation, wherein the motion of the gripper preferably around the second axis of rotation adjusts the length by which the gripper moves into the holding means of the stick of the lollipop forming unit and/or into the holding means of the stick of the lollipop packaging unit and/or to adjust the distance between two grippers to the gapping of the holding means at the forming unit and/or of the holding means at the down-stream processing unit.

The disclosure made regarding this subject matter of the present invention also applies to the other subject matters of the present invention and vice versa.

The present invention relates to a lollipop production and a down-stream processing apparatus. This lollipop production apparatus comprises a forming unit, e.g. a rotating drum with a multitude of forming chambers each forming a head of a lollipop, for example from a strand of sugar material, after a piece of material has been cut off. The shape of the head of the lollipop can be, for example flat, oval or ball-shaped. During and/or after the forming, a stick is inserted into the head of the lollipop and subsequently, the forming chamber is opened and the finalized lollipop is held at the forming unit by holding means which normally interact with the stick of the lollipop. The forming chambers of the forming unit are preferably exchangeable so that different lollipops, with different heads and/or sticks can be produced on the same forming unit. Hence, the gapping between two forming chambers and/or the gauge of the holding means can change. The transfer wheel, which is located downstream from the forming unit and which takes over the lollipops from the forming unit, rotates around a first axis and comprises a multitude of grippers at its outer circumference, which each pick the stick of a lollipop out of the holding means of the forming unit and releasably hold the stick of the lollipop during its transfer to the down-stream processing unit.

A down-stream processing apparatus or unit is located downstream from the forming unit, preferably downstream from the transfer wheel relative to the transport direction of the lollipops and is, for example, a cooling unit, a coating unit, a drying unit and/or a wrapping unit.

According to the present invention, each gripper moves relative to the transfer wheel, preferably around a second axis of rotation parallel to the first axis of rotation, to adapt the movement of the grippers of the transfer wheel to the gapping and/or gauge of the forming and/or packaging unit, respectively.

Due to the motion of the grippers relative to the transfer wheel, the radial extension of each gripper and/or its orientation is adjusted, so that it matches the gauge and/or the gapping of the holding means of the forming unit. Hence the transfer wheel can be easily adopted to different forming chambers and/or different down-stream processing units.

Preferably, each gripper is attached to means, for example a rind, which moves eccentrically around the second axis of rotation. The rotation can be clockwise or counter-clockwise. Due to the eccentric motion, the radial extension and/or the angle of the gripper relative to the transfer wheel can be reversibly changed during one rotation of the transfer wheel.

Another inventive or preferred embodiment of the present invention is a lollipop production and wrapping apparatus, wherein the grippers rotate around a third axis of rotation which is perpendicular to the first axis of rotation.

The disclosure made regarding this subject matter of the present invention also applies to the other subject matters of the present invention and vice versa.

According to this embodiment of the present invention, the grippers rotate around a third axis of rotation which is perpendicular to the first axis of rotation. Due to this rotation, the orientation of the lollipop during the transfer from the forming to the down-stream processing unit can be changed. After the lollipop has been handed over to the down-stream processing unit, the gripper rotates back into its initial position and a new lollipop can be picked from the forming unit.

According to another preferred or inventive embodiment of the present invention, each gripper is supported at the transfer wheel by a support, preferably a pivot bearing, with a cam which is preferably provided eccentrically and which interacts with a stationary control curve with a first and a second section.

The disclosure made regarding this subject matter of the present invention also applies to the other subject matters of the present invention and vice versa.

The cam and the control curve determine the position of each gripper, i.e. its radial extension and/or its angle relative to the transfer wheel. Since the control curve comprises a first and a second section, the gripper can be adjusted to the gauge and/or gapping of the forming unit as well as to the gauge and/or gapping of the packaging unit. Preferably, the first section controls the movement of the gripper adapted to the gauge and/or gapping of the forming unit and the second section controls the movement of the gripper adapted to the gauge and/or gapping of the packaging unit.

According to yet another inventive or preferred embodiment of the present invention, the transfer wheel has a drive which is independent from the drives of the forming und/or down-stream processing unit.

The disclosure made regarding this subject matter of the present invention also applies to the other subject matters of the present invention and vice versa.

The rotation of the transfer wheel is consequently not derived from the rotation of the forming unit, but the transfer wheel has its own motor, preferably an electro motor, which rotates the transfer wheel. Preferably, the drum of the forming unit and/or the transportation means of the packaging unit and/or its drive, comprise means to determine the position of the holding means and/or information about its motion, respectively. Based on the signal of this/these means, the rotation of the transfer wheel can be controlled. More preferably, the transfer wheel and/or its drive comprise means to determine its position and/or information about its motion. This information can be used to control the drive of the transfer wheel and/or the drive of the transportation means of the packaging unit.

According to another preferred or inventive embodiment of the present invention, the drive unit of the gripper comprises at least one, preferably two linear drives. Preferably, each gripper comprises two jaws, which hold the stick of the lollipop. More preferably, at least one jaw is movable from an open to a holding position and vice versa. Preferably, one linear drive opens at least one of the jaws. More preferably, the rotation of the gripper around an axis perpendicular to the axis of rotation of the transfer wheel is also facilitated by a linear drive. More preferably, at least one, most preferably both linear drive(s) is a gear rack, respectively, which is even more preferably driven by a stationary control curve of the transfer wheel.

Another embodiment of the present invention is a method to transfer a lollipop from a forming unit to a down-stream processing unit by means of a transfer wheel which rotates around an axis of rotation and which comprises a multitude of grippers, each gripping the stick of a lollipop and taking it out of the holding means of the forming unit and handing it over to the holding means of a packaging unit, wherein the lollipops are turned by 180° around an axis perpendicular to the axis of rotation of the transfer wheel while the lollipop is transferred from the forming to the down-stream processing unit.

The disclosure made regarding this subject matter of the present invention also applies to the other subject matters of the present invention and vice versa.

Preferably, each gripper is clewed relative to the transfer wheel before, while and/or after it has taken the lollipop. This slewing increases and decreases the radial extension of the gripper relative to the axis of rotation of the transfer wheel and/or rotates the gripper relative to the transfer wheel around an axis parallel to the axis of rotation of the transfer wheel. The slewing can take place while the lollipops are turned by 180° around an axis perpendicular to the axis of rotation of the transfer wheel.

According to a preferred or an inventive embodiment of the present invention, the radial extension of the gripper from the axis of rotation changes during the take over procedure.

The disclosure made regarding this subject matter of the present invention also applies to the other subject matters of the present invention and vice versa.

Due to this motion of the gripper, the lollipops can be taken out of the holding means of the forming apparatus and/or placed into the holding means of the down-stream processing unit with a component parallel to the radial extension of the holding means of the forming and/or down-stream processing unit.

According to a preferred or inventive embodiment, the transfer wheel rotates independently from the forming unit and/or the down-stream processing unit.

The disclosure made regarding this subject matter of the present invention also applies to the other subject matters of the present invention and vice versa.

The inventions are now explained according to FIGS. 1 to 8. These explanations apply to all inventions of the present application likewise. The explanations do not limit the scope of protection.

BRIEF DESCRIPTION OF THE DRAWINGS

FIGS. 4-7 show details of the gripper unit.
FIG. 8 shows details of the gripper.

DETAILED DESCRIPTION

Figure 1:
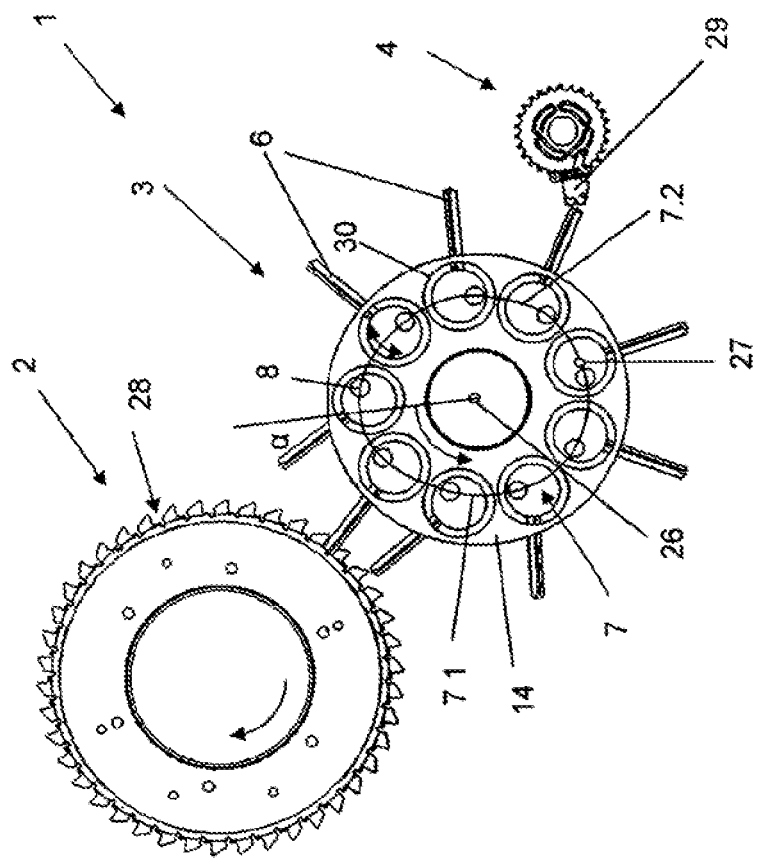
FIG. 1 shows the inventive apparatus.

FIG. 1 shows the inventive lollipop production and a down-stream processing apparatus, here a wrapping apparatus 1, which comprises among others a forming unit 2, a transfer wheel 3 and here a packaging unit 4, which is depicted only schematically. In the forming unit 2, pieces from a strand of material, for example a sugar material, are cut off and formed into the head 5.1 of a lollipop. During or after this forming, a stick 5.2 is inserted into the head. The forming unit, which is in the present case a drum, comprises, here at its circumference, a multitude of forming chambers which each can be opened and closed and which form the head of a lollipop, while the drum rotates as depicted by the arrow, here clockwise. Furthermore, each forming chamber comprises holding means 28 for the stick 5.2 of the lollipop which holds the lollipop at the transfer wheel after the forming and stick insertion has taken place and the respective forming chamber has been opened to discharge the lollipop. The forming chambers at the forming unit and/or the entire forming unit can preferably be changed, so that lollipops with different heads in size and/or in shape can be produce with the same apparatus 1.

Downstream from the forming unit, a transfer wheel 3 is provided, which picks the lollipops out of the holding means 28 and transfers them to a packaging unit 4, which also comprises transportation means, for example a chain, with holding means 29, which take over the lollipop by gripping its stick. The transfer wheel 3 comprises at its circumference a multitude of grippers 6 which each grip the stick of the lollipop in the forming unit and transfers it to the packaging unit 4, where the gripper release the stick after it has been taken over by the holding means 29 of the packaging unit. The transfer wheel rotates in the present case counter-clockwise around a first axis of rotation 26. Each gripper 6 is mounted to the core 14 of the transfer wheel by a support 30, which rotates around a second axis of rotation 27 which is parallel to the first axis of rotation 26. However, the second axis of rotation 27 is preferably arranged eccentrically so that the gripper fulfills a swiveling motion while being turned so that its radial extension from the axis 26 and/or its angle α relative to the transfer wheel can be changed. This swiveling motion allows the adjustment of the gauge and the gapping of the holding means 28 of the forming unit 2 and/or of the holding means 29 of the packaging unit 4. Each gripper is driven by a cam 8, which in contact with a stationary, not rotating, control curve 7 and thus changes the gripper's extension away from the axis of rotation 26 and/or alters its angle α, while the gripper rotates together with the core 14 around the axis 26. As can be seen from FIG. 1, the control curve 7 comprises two parts, a first part 7.1 and a second part 7.2. While the core 14 rotates, each cam 8 moves along the control curve 7. The shape of the section 7.1 is designed such that the motion, i.e. extension from axis 26 and/or angle α, of gripper 6 is adapted to the gauge and/or gapping of the holding means 28 of the forming unit 2 while the motion of the gripper 6 is adjusted to the configuration, i.e. gauge and/or gapping, of the holding means 29 of the packaging unit 4, when cam 8 is in contact with the second part 7.2 of curve 7. Preferably, sections 7.1 and sections 7.2 are different and are each tailor-made for the respective forming unit and/or packaging unit.

Figure 2:
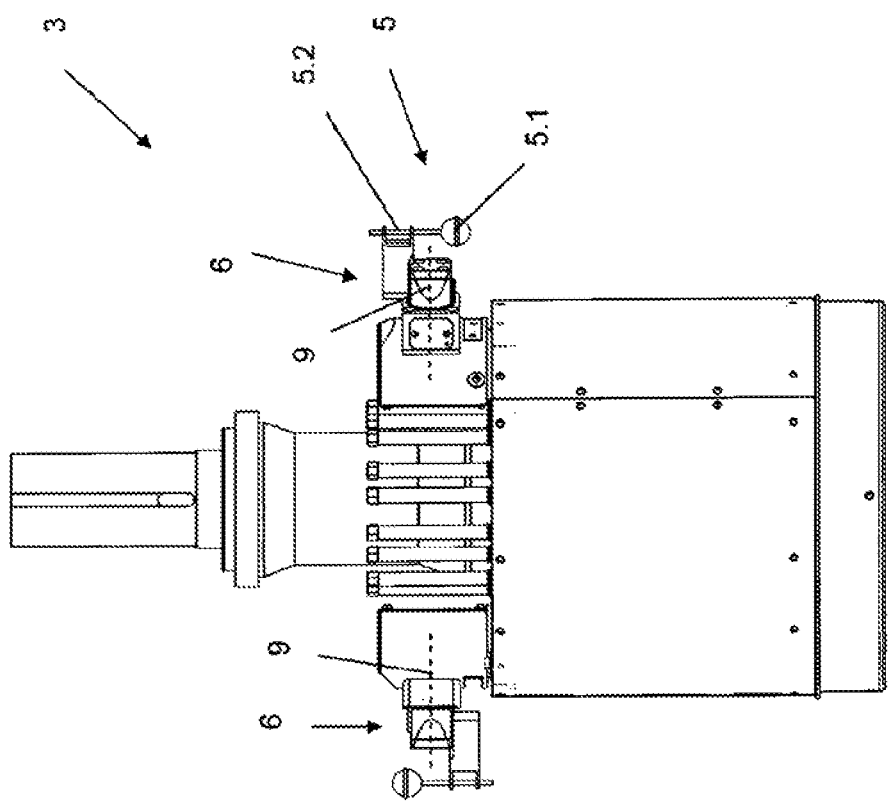
FIGS. 2 and 3 show details of the transfer wheel.
Figure 3:
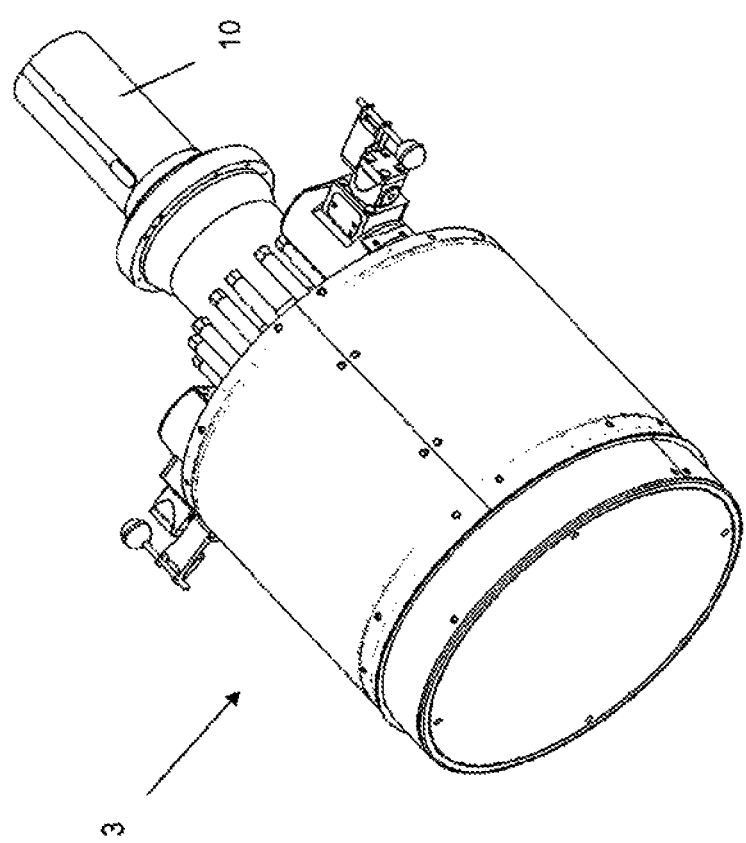

FIGS. 2 and 3 show details of the transfer wheel 3, which is in the present case a drum which comprises a drive shaft 10 which is connected to a motor (not depicted) which drives the transfer wheel preferably independently from the drives of the forming unit 2 and/or the packaging unit 4. The transfer wheel comprises a multitude of grippers 6, wherein, in the present case, only two grippers are depicted. It can be seen that the lollipop comprises a lollipop head 5.1 and a stick 5.2 and that each gripper is in contact with the stick 5.2. As can be also seen from FIGS. 2 and 3, the gripper 6 is turned around a third axis of rotation 9, which is perpendicular to the first and/or second axis of rotation 26, 27 so that, after the lollipop has been picked up from the forming unit 2, it is turned by 180° around the third rotation axis 9, before it is handed over to the packaging unit 4.

FIGS. 4-7 show details of the gripper drive unit, particularly of the means which open and close the jaws of the gripper and which rotate the gripper around 180°. As can be seen from the figures, the gripper drive unit comprises a drive 12, here a cam, which activates the gripper jaw 6.1, 6.2. Drive 13, here also a cam, facilitates the rotation of the gripper 6. Each drive 12, 13 cooperates with a stationary control curve and is hence moved back and forth relative to the drive unit 11 while the core 14 of the transfer wheel rotates. The person skilled in the art understands, that the control curve of the drives 12, 13 are preferably separated from each other and more preferably provided in parallel. Cam 12 is connected to a gear rack 18 which can be particularly seen from FIG. 7 and hence, is moved back and forth as depicted by the double arrow. Due to this linear motion, a lever 20 is rotated around a pivot 19 and thus, activates the jaw 6.2 of the gripper 6 so that it is opened and/or closed. As can be seen from FIG. 6, cam 13 moves a gear rack 16 back and forth and this movement is also transferred into a rotation by pinion 17, which turns the gripper by 180° back and forth. The entire drive unit is supported in the core 14 of the transfer unit by ball-bearings 15.

FIG. 8 shows details of the gripper. Particularly, the gripper comprises a first jaw 6.1, which is in the present case fixed and a movable jaw 6.2, which is opened and closed to grip and release the stick of the lollipop. Furthermore, the gripper comprises a spring 25, which pushes the movable jaw 6.2 into its closed condition. This assures that the closing force is limited so that the gripper and/or the stick of the lollipop cannot be damaged. The rotation of lever 20 cooperates with a lever 24, which opens the gripper jaw 6.2 when needed. The gripper can rotate around the support 23, here a ball-bearing to facilitate the rotation around the third axis 9.

LIST OF REFERENCE SIGNS 1 lollipop production and wrapping apparatus
2 forming unit
3 transfer wheel
4 down-stream processing unit, packaging unit, coating unit, cooling unit, drying unit
5 lollipop
5.1 lollipop head
5.2 stick
6 gripper
6.1 first jaw, fixed jaw
6.2 second jaw, movable jaw
7 control curve
7.1 first section of the control curve
7.2 second section of the control curve
8 cam
9 third axis of rotation
10 drive shaft
11 gripper drive unit
12 drive for the gripper jaw, linear drive
13 drive for the rotation of the gripper, linear drive
14 core
15 support, ball-bearing
16 first transfer means, gear rack
17 pinion
18 second transfer means, gear rack
19 pivot
20 rotating lever
21 long hole
22 cam
23 support, ball-bearing
24 lever
25 spring
26 first axis of rotation
27 second axis of rotation
28 holding means of the stick of the lollipop at the forming unit
29 holding means of the stick of the lollipop at the down-stream processing unit
30 support of the gripper 6 at the transfer wheel
α angle of the gripper relative to the transfer wheel

The invention claimed is:

1. A lollipop production and wrapping apparatus comprising:
   a forming unit comprising a forming chamber in which a head of a lollipop is formed and where a stick is inserted into the head,
   a down-stream processing unit, and
   a transfer wheel positioned in between the forming unit and the down-stream processing unit, the transfer wheel is configured to rotate around a first axis of rotation, the transfer wheel comprises a multitude of grippers, one of which is configured to releasably hold the stick of the lollipop while the lollipop is transferred from the forming unit to the down-stream processing unit, each one of the multitude of grippers is configured to rotate relative to the transfer wheel around a respective second axis of rotation that is parallel to the first axis of rotation, wherein each one of the multitude of grippers is attached to a means that moves eccentrically around the second axis of rotation, the eccentric motion of each of the multitude of grippers is configured to adjust a radial extension of each of the multitude of grippers relative to the first axis of rotation by moving each of the multitude of grippers in a radial direction towards the first axis of rotation and away from the first axis of rotation, which adjusts a length by which each of the multitude of grippers move into a holding means of the forming unit and/or move into a holding means of the down-stream processing unit and/or adjusts a distance between two of the multitude of grippers to a gapping of the holding means at the forming unit and/or of the holding means at the down-stream processing unit.

2. The lollipop production and wrapping apparatus according to claim 1, wherein while each of the multitude of grippers move in the radial direction, each of the multitude of grippers are also rotated 180 degrees around a third axis of rotation that is perpendicular to the first axis of rotation before the lollipop is transferred from the forming unit to the down-stream processing unit.

3. The lollipop production and wrapping apparatus according to claim 1, wherein each of the multitude of grippers are supported at the transfer wheel by a respective support with a respective cam that interacts with a stationary control curve having a first section and a second section.

4. The lollipop production and wrapping apparatus according to claim 3, the first section controls movement of each of the multitude of grippers adapted to a gauge and/or the gapping of the forming unit, and the second section controls movement of each of the multitude of grippers adapted to a gauge and/or the gapping of the down-stream processing unit.

5. The lollipop production and wrapping apparatus according to claim 1, wherein the transfer wheel has a drive that is independent from a drive of the forming unit and/or a drive of the down-stream processing unit.

6. The lollipop production and wrapping apparatus according to claim 1, wherein a drive unit of each one of the multitude of grippers comprises at least one linear drive.

7. The lollipop production and wrapping apparatus according to claim 2, wherein the rotation of the transfer wheel about the first axis is based on a signal from the forming unit and/or the down-stream processing unit.

8. The lollipop production and wrapping apparatus according to claim 7, wherein motion of the multitude of grippers around the second axis of rotation adjusts the length by which each of the multitude of grippers move into the holding means of the forming unit.

9. The lollipop production and wrapping apparatus according to claim 8, wherein motion of the multitude of grippers around the second axis of rotation adjusts the length by which each of the multitude of grippers move into the holding means of the down-stream processing unit.

10. The lollipop production and wrapping apparatus according to claim 9, wherein the forming unit and the transfer wheel rotate in opposite directions.

11. A lollipop production and wrapping apparatus comprising:
a forming unit comprising a forming chamber in which a head of a lollipop is formed and where a stick is inserted into the head of the lollipop,
a down-stream processing unit that is a cooling unit, a coating unit, a drying unit, and/or a wrapping unit, and
a transfer wheel positioned in between the forming unit and the down-stream processing unit, the transfer wheel is configured to rotate around a first axis of rotation, the transfer wheel comprises a multitude of grippers, one of which is configured to releasably hold the stick of the lollipop while the lollipop is transferred from the forming unit to the down-stream processing unit,
wherein each one of the multitude of grippers is configured to around a respective second axis of rotation that is parallel to the first axis of rotation,
wherein each one of the multitude of grippers is attached to a means that moves eccentrically around the first axis of rotation, the eccentric motion of each of the multitude of grippers adjusts a radial extension of each of the multitude of grippers relative to the first axis of rotation by moving each of the multitude of grippers in a radial direction towards the first axis of rotation and away from the first axis of rotation, and
wherein while each of the multitude of grippers move in the radial direction, each of the multitude of grippers are also configured to rotate around a third axis of rotation that is perpendicular to the first axis of rotation before the lollipop is transferred from the forming unit to the down-stream processing unit.

12. The lollipop production and wrapping apparatus according to claim 11, wherein the transfer wheel has a drive that is independent from a drive of the forming unit and/or a drive of the down-stream processing unit.

13. The lollipop production and wrapping apparatus according to claim 12, wherein the rotation of the transfer wheel about the first axis is based on a signal from the forming unit and/or the down-stream processing unit.

14. The lollipop production and wrapping apparatus according to claim 13, wherein the forming unit and, the transfer wheel rotate in opposite directions.

15. The lollipop production and wrapping apparatus according to claim 14, wherein each of the multitude of grippers move in the radial direction towards the first axis of rotation and away from the first axis of rotation to adjust a length by which each of the multitude of grippers move into a holding means of the forming unit and/or move into a holding means of the down-stream processing unit and/or adjusts a distance between two of the multitude of grippers to a gapping of the holding means at the forming unit and/or of the holding means at the down-stream processing unit.

* * * * *